(12) United States Patent
Zhou (10) Patent No.: US 12,308,428 B2
(45) Date of Patent: May 20, 2025

(54) POSITIVE ELECTRODE PLATE, AND ELECTROCHEMICAL APPARATUS AND ELECTRONIC APPARATUS CONTAINING SUCH POSITIVE ELECTRODE PLATE

(71) Applicant: Ningde Amperex Technology Limited, Ningde (CN)

(72) Inventor: Molin Zhou, Ningde (CN)

(73) Assignee: Ningde Amperex Technology Limited, Ningde (CN)

(*) Notice: Subject to any disclaimer, the term of this patent is extended or adjusted under 35 U.S.C. 154(b) by 544 days.

(21) Appl. No.: 17/700,794

(22) Filed: Mar. 22, 2022

(65) Prior Publication Data

US 2022/0310998 A1 Sep. 29, 2022

Related U.S. Application Data

(63) Continuation of application No. PCT/CN2021/083404, filed on Mar. 26, 2021.

(51) Int. Cl.
*H01M 4/525* (2010.01)
*H01M 4/02* (2006.01)
(Continued)

(52) U.S. Cl.
CPC .......... *H01M 4/525* (2013.01); *H01M 4/366* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS 5,869,208 A * 2/1999 Miyasaka ............... H01M 4/38
429/231.95
10,833,319 B2 11/2020 Marusczyk et al.
(Continued)

FOREIGN PATENT DOCUMENTS

CN 108807860 A 11/2018
CN 110265627 A 9/2019
(Continued)

OTHER PUBLICATIONS

Supplementary European Search Report for EP Application No. 21806943, mailed Sep. 9, 2022.
(Continued)

*Primary Examiner* — Kevin M Bernatz
(74) *Attorney, Agent, or Firm* — Ladas & Parry LLP (57) ABSTRACT

A positive electrode plate includes a positive electrode current collector and a positive electrode active material layer disposed on at least one surface of the positive electrode current collector, where the positive electrode active material layer includes two respective positive electrode active materials represented by chemical formula (1) and chemical formula (2): $Li_{1+x}Na_aCo_{1+y}Al_zMg_pTi_uM_vO_{2+w}$ (1), where in chemical formula (1), M includes at least one of Zr, La, or Y, $-0.1<x<0.1$, $0<a<0.005$, $-0.05<y<0.05$, $0.01<z<0.05$, $0.001<p<0.01$, $0<u<0.005$, $0<v<0.005$, and $-0.05<w<0.05$; and $Li_{2+r}Na_sN_{1+q}O_{2+t}$ (2), where in chemical formula (2), $-0.2<r<0.2$, $0 \leq s \leq 0.05$, $-0.1<q<0.1$, $-0.05<t<0.05$, and N includes at least one of Ni, Cu, Mn, Fe, or Co. Such a positive electrode plate can achieve a high specific discharge capacity of the electrochemical apparatus, thereby increasing high-temperature cycling performance and energy density of the electrochemical apparatus.

17 Claims, 2 Drawing Sheets

(51) Int. Cl.
*H01M 4/36* (2006.01)
*H01M 10/0525* (2010.01)

(56) References Cited

U.S. PATENT DOCUMENTS

| | | | | |
|---|---|---|---|---|
| 11,114,663 | B2* | 9/2021 | Dai | H01M 4/485 |
| 2014/0170492 | A1* | 6/2014 | Xia | H01M 4/505 |
| | | | | 429/219 |
| 2020/0006769 | A1* | 1/2020 | Paulsen | H01M 4/505 |
| 2020/0118769 | A1* | 4/2020 | Ma | H01M 4/505 |
| 2020/0119391 | A1* | 4/2020 | Ma | H01M 4/131 |
| 2020/0144626 | A1* | 5/2020 | Lee | C01G 49/0027 |
| 2021/0036368 | A1 | 2/2021 | Jiang et al. | |
| 2021/0151752 | A1* | 5/2021 | Park | C01G 51/42 |
| 2021/0226201 | A1* | 7/2021 | Lim | C23C 16/4417 |
| 2021/0280863 | A1* | 9/2021 | Liu | H01M 4/525 |
| 2022/0044837 | A1* | 2/2022 | Gwon | H01M 10/0562 |
| 2022/0158251 | A1* | 5/2022 | Lee | H01M 50/121 |
| 2022/0190316 | A1* | 6/2022 | Seo | C01G 53/50 |
| 2022/0216460 | A1* | 7/2022 | Kuroda | H01M 4/364 |
| 2022/0223862 | A1* | 7/2022 | Wu | H01M 4/131 |
| 2022/0223904 | A1* | 7/2022 | Choi | C01G 25/006 |
| 2022/0263061 | A1* | 8/2022 | Ceder | H01M 10/0562 |
| 2022/0310988 | A1* | 9/2022 | Zhou | H01M 4/525 |
| 2022/0407064 | A1* | 12/2022 | Seo | H01M 4/505 |
| 2022/0411284 | A1* | 12/2022 | Seo | H01M 4/131 |
| 2022/0416240 | A1* | 12/2022 | Seo | H01M 4/131 |
| 2023/0053984 | A1* | 2/2023 | Seo | H01M 4/505 |
| 2023/0197959 | A1* | 6/2023 | Dong | H01M 4/485 |
| | | | | 429/221 |
| 2024/0234707 | A1* | 7/2024 | Kim | H01M 4/505 |

FOREIGN PATENT DOCUMENTS

| | | |
|---|---|---|
| CN | 111370686 A | 7/2020 |
| CN | 111969214 A | 11/2020 |
| CN | 112397766 A | 2/2021 |
| JP | 2008270086 A | 11/2008 |
| JP | 2015133193 A | 7/2015 |

OTHER PUBLICATIONS

Written Opinion of EPO for EP Application No. 21806943.
EP communication (intention to grant) for EP Application No. 21806943.3, mailed Jun. 22, 2023.
Office Action of JP Application No. 2021-541551, mailed Jul. 11, 2023.
ISR for International Application PCT/CN2021/083404 mailed Dec. 13, 2021.

* cited by examiner

POSITIVE ELECTRODE PLATE, AND ELECTROCHEMICAL APPARATUS AND ELECTRONIC APPARATUS CONTAINING SUCH POSITIVE ELECTRODE PLATE

CROSS-REFERENCE TO RELATED APPLICATIONS

This application is a continuation of International Patent Application No. PCT/CN2021/083404, filed on Mar. 26, 2021, the disclosure of which is hereby incorporated by reference in its entirety.

TECHNICAL FIELD

This application relates to the technical field of electrochemistry, and in specifically, to a positive electrode plate, and an electrochemical apparatus and an electronic apparatus containing such positive electrode plate.

BACKGROUND

Lithium-ion secondary batteries have advantages such as high energy storage density, high open-circuit voltage, low self-discharge rate, long cycle life, and high safety, and therefore are widely used in various fields such as electric energy storage, mobile electronic devices, electric vehicles, and aerospace equipment. As the mobile electronic devices and the electric vehicles enter a stage of rapid development, the market requires the lithium-ion secondary batteries to have higher energy density, cycling performance, and kinetic performance.

In the first charge and discharge process of the lithium-ion secondary batteries, a large amount of solid electrolyte interphases (Solid Electrolyte Interphase, SEI) are generated on a surface of a negative electrode, consuming limited lithium ions and electrolytes in the lithium-ion secondary batteries. This causes irreversible capacity loss and reduces energy density of the lithium-ion secondary batteries. In batteries with a graphite negative electrode, about 10% of an active lithium source is consumed in the first cycle; and under the condition that the negative electrode is made of a negative electrode material with a high specific capacity, such as alloy (silicon, tin, or the like), oxide (silicon oxide, tin oxide, or the like), or amorphous carbon, much more of the active lithium source is consumed. Therefore, a proper lithium supplementation method is particularly important for improving the energy density of the lithium-ion secondary batteries.

At present, to resolve the foregoing issues, a negative electrode lithium supplementation method is proposed as follows: generally adding lithium metal powder or stabilized lithium metal powder to a negative electrode slurry. The lithium metal powder/stabilized lithium metal powder is highly reactive in that it easily reacts with moisture in the air, and therefore is of high risk. As a result, stringent production environments and manufacturing processes are required, bringing a huge challenge to negative electrode lithium supplementation.

SUMMARY

Objectives of this application are to provide a positive electrode plate, and an electrochemical apparatus and an electronic apparatus containing such positive electrode plate, so as to improve energy density and cycling stability, especially energy density and cycling stability at high temperature, of the electrochemical apparatus. Specific technical solutions are as follows.

It should be noted that in the content of this application, a lithium-ion secondary battery is used as an example of an electrochemical apparatus to explain this application, but the electrochemical apparatus in this application is not limited to the lithium-ion secondary battery. Specific technical solutions are as follows.

A first aspect of this application provides a positive electrode plate, including a positive electrode current collector and a positive electrode active material layer disposed on at least one surface of the positive electrode current collector, where the positive electrode active material layer includes a first positive electrode active material represented by chemical formula (1) and a second positive electrode active material represented by chemical formula (2) $Li_{1+x}Na_aCo_{1+y}Al_zMg_pTi_uM_vO_{2+w}$ (1), where in chemical formula (1), M includes at least one of Zr, La, or Y, $-0.1 < x < 0.1$, $0 < a < 0.005$, $-0.05 < y < 0.05$, $0.01 < z < 0.05$, $0.001 < p < 0.01$, $0 < u < 0.005$, $0 < v < 0.005$, and $-0.05 < w < 0.05$; and $Li_{2+r}Na_sN_{1+q}O_{2+t}$ (2), where in chemical formula (2), $-0.2 < r < 0.2$, $0 \le s \le 0.05$, $-0.1 < q < 0.1$, $-0.05 < t < 0.05$, and N includes at least one of Ni, Cu, Mn, Fe, or Co. Regardless of any theory, in this application, both the first positive electrode active material and the second positive electrode active material are used to generate a synergistic effect. During the first charge, the second positive electrode active material can delithiate a large number of lithium ions during the first charge because of its characteristic of a high initial specific charge capacity, so that active lithium loss caused by a generated SEI is effectively compensated for. During the first discharge, there are enough lithium ions to be intercalated in the first positive electrode active material, effectively increasing a specific discharge capacity of a lithium-ion secondary battery, thereby increasing energy density of the lithium-ion secondary battery. Furthermore, some of the lithium ions delithiated by the second positive electrode active material during the first charge may alternatively be stored at a negative electrode and released slowly in subsequent cycles, helping alleviate cycling degradation of the lithium-ion secondary battery. In addition, the first positive electrode active material in this application has high true density, and the positive electrode plate containing the material can be rolled to relatively high compacted density, helping further increase the limit volumetric energy density of the lithium-ion secondary battery.

In this application, Li sites of the first positive electrode active material of a layered structure are doped with sodium (Na), expanding a lithium ion migration channel and increasing a lithium ion migration capacity. In addition, Co sites are furthered doped with Al, Mg, or Y, and the first positive electrode active material contains Ti, Zr, or La, improving structural stability of the material. In addition, the second positive electrode active material is doped with Na, expanding a lithium ion migration channel, and better high-temperature cycling performance and volumetric energy density are obtained.

In this application, the positive electrode current collector includes a first surface and a second surface that are opposite each other in a thickness direction, and the positive electrode active material layer is disposed on the at least one surface of the positive electrode current collector. A person skilled in the art should understand that the positive electrode active material layer may be disposed on the first surface, or the second surface, or both the first surface and the second surface. A person skilled in the art may make a selection according to an actual need. It should be noted that the "surface" may be an entire zone or a partial zone of the first surface and/or the second surface. This is not particularly limited in this application provided that the objectives of this application can be achieved.

In an embodiment of this application, compacted density P of the positive electrode plate satisfies: 3.85 g/cm³<P<4.35 g/cm³, and preferably, 4.05 g/cm³<P<4.30 g/cm³. Controlling the compacted density P of the positive electrode plate within the foregoing range is beneficial to migration of electrons and ions in the positive electrode plate, thereby improving high-temperature cycling performance and volumetric energy density of the lithium-ion secondary battery. A lower limit of the compacted density P of the positive electrode plate may include the following numerical value: 3.85, 3.9, 4.0, or 4.05; and an upper limit of the compacted density P of the positive electrode plate may include the following numerical value: 4.1, 4.2, 4.3, or 4.35.

In an embodiment of this application, a mass ratio of the first positive electrode active material to the second positive electrode active material ranges from 4:1 to 200:1, and preferably, 9:1 to 100:1. Regardless of any theory, when the mass ratio of the first positive electrode active material to the second positive electrode active material is excessively low, a relative amount of the second positive electrode active material is excessively large, resulting in "enrichment" of lithium in the positive electrode active material layer, thereby affecting high-temperature cycling performance of the lithium-ion secondary battery. When the mass ratio of the first positive electrode active material to the second positive electrode active material is excessively high, the relative amount of the second positive electrode active material is excessively small, providing insufficient active lithium for SEI consumption, and affecting the high-temperature cycling performance and the energy density of the lithium-ion secondary battery. When the mass ratio of the first positive electrode active material to the second positive electrode active material is controlled within the foregoing range, the positive electrode active material layer can have higher structural stability, and therefore capacity loss and impedance increase caused by a compromised positive electrode active material structure can be reduced, maintaining the cycling stability and the kinetic performance of the lithium-ion secondary battery. A lower limit of the mass ratio may include the following numerical value: 4:1, 10:1, 20:1, 30:1, 50:1, 70:1, or 90:1; and an upper limit of the mass ratio of the first positive electrode active material to the second positive electrode active material may include the following numerical value: 100:1, 130:1, 150:1, 170:1, or 200:1.

In an embodiment of this application, based on total mass of the positive electrode active material layer, a mass percentage of the first positive electrode active material ranges from 80% to 98.5%, and preferably, 85% to 98.5%. Controlling the percentage of the first positive electrode active material in the positive electrode active material layer within the foregoing range enables the positive electrode active material layer to have good structural stability, thereby reducing capacity loss and impedance increase caused by a compromised positive electrode active material structure. A lower limit of the percentage of the first positive electrode active material may include the following numerical value: 80 wt %, 85 wt %, or 88 wt %; and an upper limit of the percentage of the first positive electrode active material may include the following numerical value: 90 wt %, 95 wt %, or 98.5 wt %.

In an embodiment of this application, Dv50 of the first positive electrode active material ranges from 3 μm to 20 μm, and preferably, 5 μm to 16 μm; and Dv90 of the first positive electrode active material ranges from 12 μm to 45 μm, and preferably, 18 μm to 40 μm. Using the first positive electrode active material within the foregoing particle size distribution range further improves electron and ion migration performance of the positive electrode plate, thereby improving the cycling performance and the kinetic performance of the lithium-ion secondary battery. A lower limit of Dv50 of the first positive electrode active material may include the following numerical value: 3 μm, 5 μm, 7 μm, or 10 μm; and an upper limit of Dv50 of the first positive electrode active material may include the following numerical value: 12 μm, 15 μm, or 20 μm. A lower limit of Dv90 of the first positive electrode active material may include the following numerical value: 5 μm, 7 μm, or 10 μm; and an upper limit of Dv90 of the first positive electrode active material may include the following numerical value: 12 μm, 14 μm, or 16 μm.

In an embodiment of this application, Dv50 of the second positive electrode active material ranges from 6 μm to 18 μm, and preferably, 10 μm to 16 μm; and Dv90 of the second positive electrode active material ranges from 15 μm to 32 μm, and preferably, 18 μm to 30 μm. Using the second positive electrode active material within the foregoing particle size distribution range further improves electron and ion migration performance of the positive electrode plate, thereby improving the cycling performance and the kinetic performance of the lithium-ion secondary battery. A lower limit of Dv50 of the second positive electrode active material may include the following numerical value: 6 μm, 8 μm, 10 μm, or 12 μm; and an upper limit of Dv50 of the second positive electrode active material may include the following numerical value: 14 μm, 16 μm, or 18 μm. A lower limit of Dv90 of the second positive electrode active material may include the following numerical value: 15 μm, 17 μm, 18 μm, 19 μm, 21 μm, or 23 μm. An upper limit of Dv90 of the second positive electrode active material may include the following numerical value: 25 μm, 27 μm, 29 μm, 30 μm, or 32 μm.

In this application, Dv50 indicates a particle size in volume-based particle size distribution, where particles sizes of 50% of particles are not greater than this particle size. Dv90 indicates a particle size in volume-based particle size distribution, where particles sizes of 90% of particles are not greater than this particle size.

In an embodiment of this application, the second positive electrode active material satisfies: X≥300 mAh/g, and Y/X≤40%. It indicates that the second positive electrode active material has a high specific capacity, and can release a large number of lithium ions during the first charge to compensate for active lithium loss caused by a generated SEI. During the first discharge, there are enough lithium ions to be intercalated in the first positive electrode active material, effectively increasing a specific discharge capacity of the battery, thereby increasing energy density of the lithium-ion secondary battery. X is an initial specific charge capacity of the second positive electrode active material, and Y is an initial specific discharge capacity of the second positive electrode active material.

In an embodiment of this application, the positive electrode active material layer includes a first positive electrode active material layer and a second positive electrode active material layer, the first positive electrode active material layer includes the first positive electrode active material, and the second positive electrode active material layer includes the second positive electrode active material. In this application, the first positive electrode active material and the second positive electrode active material may be separately slurried, and then the resulting slurries are sequentially applied on the first surface and the second surface of the positive electrode current collector to form the first positive electrode active material layer and the second positive electrode active material layer separately. In some embodiments of this application, the first surface and/or the second surface of the positive electrode current collector are sequentially provided with the first positive electrode active material layer and the second positive electrode active material layer. In some embodiments of this application, the first surface and/or the second surface of the positive electrode current collector are sequentially provided with the second positive electrode active material layer and the first positive electrode active material layer. In some embodiments of this application, the first surface/the second surface of the positive electrode current collector are sequentially provided with the first positive electrode active material layer and the second positive electrode active material layer, and the second surface/the first surface of the positive electrode current collector are sequentially provided with the first positive electrode active material layer and the second positive electrode active material layer. The second positive electrode active material in any of the foregoing embodiments may be used as a positive electrode lithium supplement material in the positive electrode plate.

In the positive electrode plate of this application, the positive electrode current collector is not particularly limited, and may be a well-known positive electrode current collector in the art, for example, aluminum foil, aluminum alloy foil, or a composite current collector. In this application, neither a thickness of the positive electrode current collector nor a thickness of the positive electrode active material layer is particularly limited. Neither a thickness of the first positive electrode active material layer nor a thickness of the second positive electrode active material layer is particularly limited, provided that the objectives of this application can be achieved. For example, the thickness of the positive electrode current collector ranges from 5 μm to 20 μm. The thickness of the positive electrode active material layer ranges from 30 μm to 120 μm. Optionally, the positive electrode plate may further include a conductive layer. The conductive layer is sandwiched between the positive electrode current collector and the positive electrode active material layer. The conductive layer is not limited to a particular composition, and may be a conductive layer commonly used in the art. The conductive layer includes a conductive agent and a binder.

A negative electrode plate in this application may include a negative electrode current collector and a negative electrode active material layer disposed on at least one surface of the negative electrode current collector. The negative electrode current collector is not particularly limited in this application provided that it can achieve the objectives of this application. For example, it may include copper foil, copper alloy foil, nickel foil, stainless steel foil, titanium foil, foamed nickel, foamed copper, a composite current collector, or the like. The negative electrode active material layer in this application includes a negative electrode active material, a conductive agent, and a thickener. The negative electrode active material in this application may include one or more of natural graphite, artificial graphite, a mesocarbon microbead (MCMB), hard carbon, soft carbon, silicon, a silicon-carbon composite, $SiO_x$ (0.5<x<1.6), a Li—Sn alloy, a Li—Sn—O alloy, Sn, SnO, $SnO_2$, spinel-structure lithium titanate $Li_4Ti_5O_{12}$, a Li—Al alloy, lithium metal, or the like. In this application, neither a thickness of the negative electrode current collector nor a thickness of the negative electrode active material layer is particularly limited, provided that the objectives of this application can be achieved. For example, the thickness of the negative electrode current collector ranges from 6 μm to 10 μm, and the thickness of the negative electrode active material layer ranges from 30 μm to 120 μm. In this application, a thickness of the negative electrode plate is not particularly limited, provided that the objectives of this application can be achieved. For example, the thickness of the negative electrode plate ranges from 50 μm to 150 μm. Optionally, the negative electrode plate may further include a conductive layer. The conductive layer is sandwiched between the negative electrode current collector and the negative electrode material layer. The conductive layer is not limited to a particular composition, and may be a conductive layer commonly used in the art. The conductive layer includes a conductive agent and a binder.

The conductive agent is not particularly limited, provided that it can achieve the objectives of this application. For example, the conductive agent may include at least one of conductive carbon black (Super P), carbon nanotubes (CNTs), carbon nanofibers, flake graphite, acetylene black, carbon black, Ketjen black, carbon dots, or graphene. The binder is not particularly limited, and may be any binder known in the art provided that it can achieve the objectives of this application. For example, the binder may include at least one of polyacrylic alcohol, sodium polyacrylate, potassium polyacrylate, lithium polyacrylate, polyimide, polyamideimide, styrene butadiene rubber (SBR), polyvinyl alcohol (PVA), polyvinylidene fluoride, polyvinylidene difluoride (PVDF), polytetrafluoroethylene (PTFE), polyvinyl butyral (PVB), water-based acrylic resin, carboxymethyl cellulose (CMC), sodium carboxymethyl cellulose (CMC-Na), or the like.

The separator in this application is not particularly limited, provided that it can achieve the objectives of this application. For example, the separator may be at least one of a polyethylene (PE) and polypropylene (PP)-based polyolefin (PO) separator, a polyester film (for example, a polyethylene terephthalate (PET) film), a cellulose film, a polyimide film (PI), a polyamide film (PA), a spandex or aramid film, a woven film, a non-woven film (non-woven fabric), a microporous film, a composite film, a separator paper, a laminated film, a spinning film, or the like. For example, the separator may include a substrate layer and a surface treatment layer. The substrate layer may be a non-woven fabric, film, or composite film of a porous structure. The substrate layer may be made of at least one of polyethylene, polypropylene, polyethylene terephthalate, polyimide, or the like. Optionally, a polypropylene porous film, a polyethylene porous film, a polypropylene non-woven fabric, a polyethylene non-woven fabric, or a polypropylene-polyethylene-polypropylene porous composite film may be used. Optionally, a surface treatment layer is provided on at least one surface of the substrate layer, and the surface treatment layer may be a polymer layer or an inorganic substance layer, or a layer formed by a polymer and an inorganic substance. For example, the inorganic substance layer includes an inorganic particle and a binder. The inorganic particle is not particularly limited, and for example, may be selected from at least one of aluminum oxide, silicon oxide, magnesium oxide, titanium oxide, hafnium dioxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, barium sulfate, or the like. The binder is not particularly limited, and for example, may be selected from a combination of one or more polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene. The polymer layer contains a polymer, and the polymer is made of at least one of polyamide, polyacrylonitrile, an acrylate polymer, polyacrylic acid, polyacrylate, polyvinylpyrrolidone, polyvinyl ether, polyvinylidene fluoride, poly(vinylidene fluoride-hexafluoropropylene), or the like.

The lithium-ion battery in this application further includes an electrolyte. The electrolyte may be one or more of a gel electrolyte, a solid electrolyte, and a liquid electrolyte. The liquid electrolyte includes a lithium salt and a non-aqueous solvent. In some embodiments of this application, the lithium salt may include at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, $LiPF_6$ may be selected as the lithium salt because it can provide high ionic conductivity and improve the cycling performance. The non-aqueous solvent may be a carbonate compound, a carboxylate compound, an ether compound, another organic solvent, or a combination thereof. The carbonate compound may be a linear carbonate compound, a cyclic carbonate compound, a fluorocarbonate compound, or a combination thereof. Examples of the linear carbonate compound are dimethyl carbonate (DMC), diethyl carbonate (DEC), dipropyl carbonate (DPC), methyl propyl carbonate (MPC), ethylene propyl carbonate (EPC), ethyl methyl carbonate (MEC), and a combination thereof. Examples of the cyclic carbonate compound are ethylene carbonate (EC), propylene carbonate (PC), butylene carbonate (BC), vinyl ethylene carbonate (VEC), and a combination thereof. Examples of the fluorocarbonate compound are fluoroethylene carbonate (FEC), 4,5-difluoro-1,3-dioxolan-2-one, 4,4-difluoro-1,3-dioxolan-2-one, 4,4,5-trifluoro-1,3-dioxolan-2-one, 4,4,5,5-tetrafluoro-1,3-dioxolan-2-one, 4-fluoro-5-methyl-1,3-dioxolan-2-one, 4-fluoro-4-methyl-1,3-dioxolan-2-one, 4,5-difluoro-4-methyl-1,3-dioxolan-2-one, 4,4,5-trifluoro-5-methyl-1,3-dioxolan-2-one, 4-(trifluoromethyl)-1,3-dioxolan-2-one, and a combination thereof. Examples of the carboxylate compound are methyl formate, methyl acetate, ethyl acetate, n-propyl acetate, tert-butyl acetate, methyl propionate, ethyl propionate, propyl propionate, γ-butyrolactone ester, caprolactone, valerolactone, mevalonolactone, caprolactone, and a combination thereof. Examples of the ether compound are dibutyl ether, tetraglyme, diglyme, 1,2-dimethoxyethane, 1,2-diethoxyethane, ethoxymethoxyethane, 2-methyltetrahydrofuran, tetrahydrofuran, and a combination thereof. Examples of the another organic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, and a combination thereof.

During preparation of the positive electrode active material layer in this application, the order of adding the first positive electrode active material and the second positive electrode active material is not particularly limited. For example, they may be directly mixed uniformly during slurry preparation, and the mixed slurry may be applied on the first surface and/or the second surface of the positive electrode current collector. Alternatively, the first positive electrode active material and the second positive electrode active material may be separately slurried, and then the resulting slurries are sequentially applied on the first surface and/or the second surface of the positive electrode current collector to form the first positive electrode active material layer and the second positive electrode active material layer separately.

This application further provides an electrochemical apparatus, including the positive electrode plate according to any one of the foregoing embodiments. The electrochemical apparatus has excellent high-temperature cycling performance and volumetric energy density.

The electrochemical apparatus in this application is not particularly limited, and may be any apparatus where electrochemical reactions take place. In some embodiments, the electrochemical apparatus may include, but is not limited to: a lithium metal secondary battery, a lithium-ion secondary battery (a lithium-ion battery), a lithium polymer secondary battery, a lithium-ion polymer secondary battery, or the like.

This application further provides an electronic apparatus, including the electrochemical apparatus according to the embodiments of this application. The electronic apparatus has excellent high-temperature cycling performance and volumetric energy density.

The electronic apparatus in this application is not particularly limited, and may be any known electronic apparatus used in the prior art. In some embodiments, the electronic apparatus may include, but is not limited to: a notebook computer, a pen-input computer, a mobile computer, an e-book player, a portable phone, a portable fax machine, a portable copier, a portable printer, a head-mounted stereo headset, a video recorder, a liquid crystal display television, a portable cleaner, a portable CD player, a mini disc, a transceiver, an electronic notebook, a calculator, a memory card, a portable recorder, a radios, a backup power supply, a motors, an automobiles, a motorcycle an assisted bicycle, bicycle, a lighting apparatus, a toy, a game console, a clock, an electric tool, a flashlights, a camera, a large household storage battery, or a lithium-ion capacitor.

A preparation process of the electrochemical apparatus is common sense for a person skilled in the art, and is not particularly limited in this application. For example, the electrochemical apparatus may be manufactured in the following process: a positive electrode plate and a negative electrode plate are stacked with a separator therebetween, and are put into a housing after operations such as winding and folding as needed. The housing is injected with a liquid electrolyte and then sealed. The separator used is the foregoing separator provided in this application. In addition, if necessary, an overcurrent prevention element, a guide plate, and the like may be placed in the housing to prevent pressure increase, overcharge, and discharge in the electrochemical apparatus.

This application provides a positive electrode plate, an electrochemical apparatus containing the positive electrode plate, and an electronic apparatus. The positive electrode plate includes a positive electrode current collector and a positive electrode active material layer disposed on at least one surface of the positive electrode current collector, where the positive electrode active material layer includes a first positive electrode active material represented by chemical formula (1) and a second positive electrode active material represented by chemical formula (2): $Li_{1+x}Na_aCo_{1+y}Al_zMg_pTi_uM_vO_{2+w}$ (1), and $Li_{2+r}Na_sN_{1+q}O_{2+t}$ (2). The positive electrode plate having the first positive electrode active material and the second positive electrode active material in this application can fully a synergistic effect between the first positive electrode active material and the second positive electrode active material, effectively improving high-temperature cycling performance and energy density of the electrochemical apparatus.

BRIEF DESCRIPTION OF DRAWINGS

To describe the technical solutions in this application more clearly, the following briefly describes the accompanying drawings required for describing the embodiments. Apparently, the accompanying drawings in the following description show merely some embodiments of this application.

In the Figures: 10. positive electrode current collector; 20. positive electrode active material layer; 21. first positive electrode active material layer; 22. second positive electrode active material layer; 31. first surface; and 32. second surface.

DETAILED DESCRIPTION

To make the objectives, technical solutions, and advantages of this application clearer, the following further details this application with reference to the accompanying drawings and embodiments. Apparently, the described embodiments are merely some but not all of the embodiments of this application. All other technical solutions obtained by a person of ordinary skill in the art based on the embodiments of this application shall fall within the protection scope of this application.

It should be noted that in the specific embodiments of this application, a lithium-ion secondary battery is used as an example of an electrochemical apparatus to explain this application, but the electrochemical apparatus in this application is not limited to the lithium-ion secondary battery.

Figure 1:
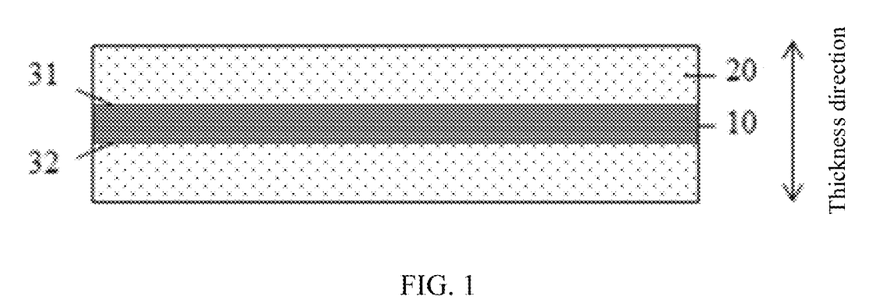
FIG. 1 is a schematic structural diagram of a positive electrode plate according to an embodiment of this application.
Figure 2:
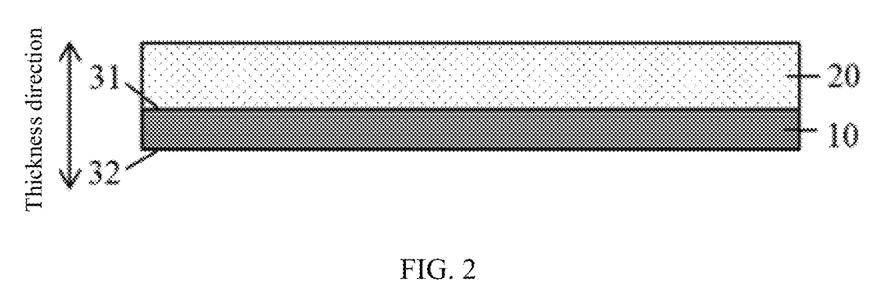
FIG. 2 is a schematic structural diagram of a positive electrode plate according to another embodiment of this application.

FIG. 1 is a schematic structural diagram of a positive electrode plate according to an embodiment of this application. As shown in FIG. 1, a positive electrode current collector 10 is coated with a positive electrode active material layer 20 on a first surface 31 and a second surface 32 in a thickness direction. A first positive electrode active material and a second positive electrode active material in the positive electrode active material layer 20 are directly mixed uniformly during slurry preparation. The mixed slurry is applied on the first surface 31 and the second surface 32 of the positive electrode current collector 10, or certainly, may be applied only on the first surface 31 or the second surface 32, as shown in FIG. 2. FIG. 2 is a schematic structural diagram of a positive electrode plate according to another embodiment of this application. The positive electrode active material layer 20 is applied only on the first surface 31 of the positive electrode current collector 10, and not applied on the second surface 32.

Figure 3:
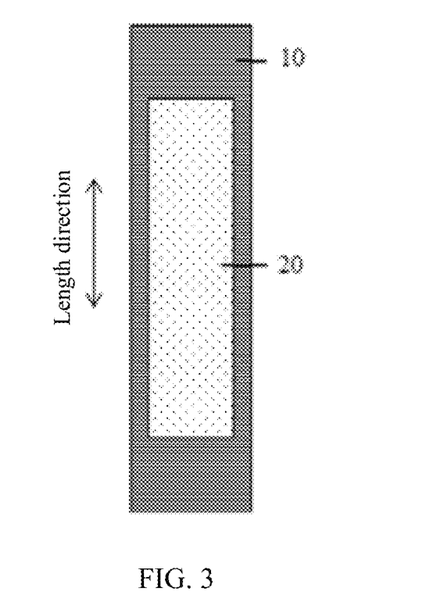
FIG. 3 is a schematic structural diagram of a positive electrode plate according to still another embodiment of this application.

FIG. 3 is a schematic structural diagram of a positive electrode plate according to still another embodiment of this application. As shown in FIG. 3, the positive electrode active material layer 20 is applied on part of a surface of the positive electrode current collector 10. Certainly, the positive electrode active material layer 20 may alternatively be applied on the entire surface of the positive electrode current collector 10.

Figure 4:
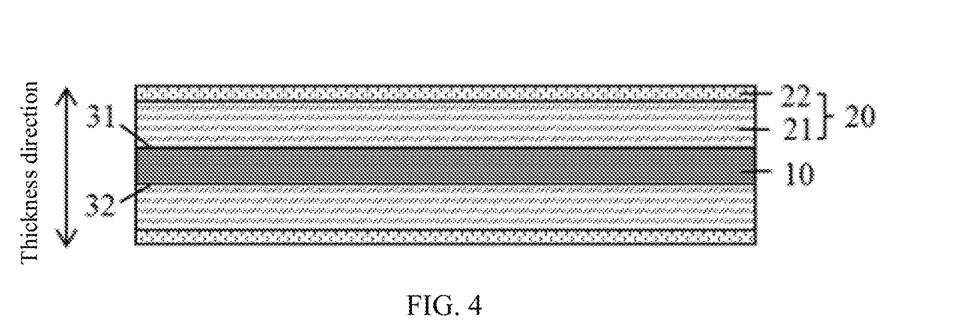
FIG. 4 is a schematic structural diagram of a positive electrode plate according to still another embodiment of this application.
Figure 5:
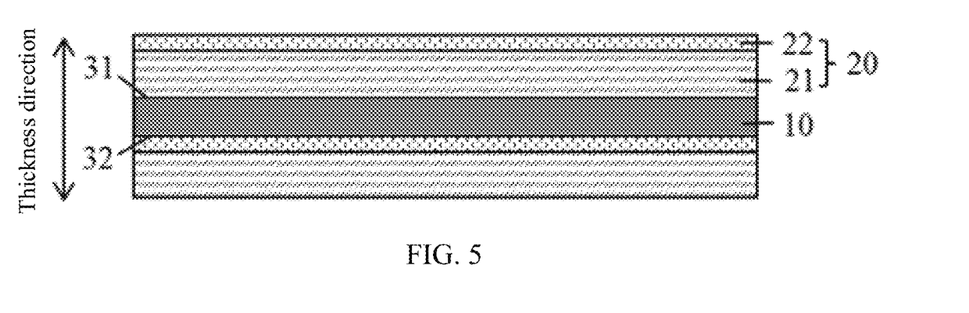
FIG. 5 is a schematic structural diagram of a positive electrode plate according to still another embodiment of this application.

FIG. 4 and FIG. 5 each are a schematic structural diagram of a positive electrode plate according to still another embodiment of this application. As shown in FIG. 4 and FIG. 5, the first positive electrode active material and the second positive electrode active material in the positive electrode active material layer 20 are separately slurried, and the resulting slurries are sequentially applied on the first surface 31 and the second surface 32 of the positive electrode current collector 10. In these two embodiments, the positive electrode active material layer 20 includes a first positive electrode active material layer 21 and a second positive electrode active material layer 22. As shown in FIG. 4, the first surface 31/the second surface 32 is sequentially coated with the first positive electrode active material layer 21 and the second positive electrode active material layer 22 in a direction in which the first surface 31/the second surface 32 extends outward. As shown in FIG. 5, the first surface 31 is sequentially coated with the first positive electrode active material layer 21 and the second positive electrode active material layer 22 in a direction in which the first surface 31 extends outward, and the second surface 32 is sequentially coated with the second positive electrode active material layer 22 and the first positive electrode active material layer 21 in a direction in which the second surface 32 extends outward.

EXAMPLES

The following further details the embodiments of this application by using examples and comparative examples. Various tests and evaluations were performed in the following methods. In addition, unless otherwise specified, "percentage" and "%" are a mass measurement base.

Test Method and Device

Compacted Density P of a Positive Electrode Plate

The compacted density P of the positive electrode plate was calculated using the formula: $P=m/v$. In the formula, m was mass of the positive electrode active material layer in a unit of g, and v was a volume of the positive electrode active material layer in a unit of $cm^3$. The volume v was a product of an area Ar of the positive electrode active material layer and a thickness of the positive electrode active material layer.

Positive Electrode Active Material Dv50 and Dv90 Test

A laser particle size analyzer was used to test Dv50 and Dv90 of a first positive electrode active material and a second positive electrode active material.

Cycling Performance Test

At 45° C., a lithium-ion secondary battery was constant-current charged to 4.45 V at a rate of 1.5 C, constant-voltage charged to a current less than or equal to 0.05 C, and then constant-current discharged to 3.0 V at a rate of 1 C. This was a charge-discharge cycle. A discharge capacity of the lithium-ion secondary battery for the first cycle was recorded. The lithium-ion secondary battery was charged and discharged by using the foregoing method, a discharge capacity for each cycle was recorded until the discharge capacity of the lithium-ion secondary battery degraded to 80% of a discharge capacity for the first cycle, and the number of charge-discharge cycles was recorded.

Energy Density Test

At 25° C., the formed lithium-ion secondary battery was constant-current charged to 4.45 V at a rate of 0.2 C, constant-voltage charged to a current less than or equal to 0.05 C, stood for 30 minutes, and then constant-current discharged to 3.0 V at a rate of 0.2 C. A discharge capacity $D_0$ (Ah) and a discharge platform $P_0$ (V) of the lithium-ion secondary battery at a rate of 0.2 C were recorded. A volume of the lithium-ion battery was measured and recorded as $V_0$ (L). The energy density of the lithium-ion secondary battery was calculated according to the following formula: energy density=$D_0 \times P_0/m_0$, with a unit of Wh/L.

Specific Charge and Discharge Capacity Test

"Preparation of a Button Battery"

A positive electrode lithium supplementation material, a conductive agent conductive carbon black, and a binder polyvinylidene difluoride (PVDF) were mixed at a mass ratio of 90:5:5, with N-methylpyrrolidone (NMP) added as a solvent, and the resulting mixture was stirred to prepare a slurry with a solid content of 40%. The slurry was applied with a scraper on an aluminum foil current collector to form a 100 μm thick coating layer. The coating layer was dried in a vacuum drying oven for 12 hours at 130° C., and then was cut into a circular plate with a diameter of 1 cm in a dry environment by using a punching machine. A lithium metal plate was used as a counter electrode in a glove box, a Ceglard composite membrane was selected as a separator, and a liquid electrolyte was added to assemble the button battery. The liquid electrolyte was an organic solution obtained by mixing ethylene carbonate (EC), ethyl methyl carbonate (EMC), and diethyl carbonate (DEC) at a mass ratio of 30:50:20. A concentration of a lithium salt in the liquid electrolyte was 1.15 mol/L.

"Specific Charge Capacity Test"

The LANHE CT2001A system was used to perform the specific charge capacity test in this application. The to-be-tested button battery containing the positive electrode lithium supplementation material was stood for 30 minutes in a 25±3° C. environment, constant-current charged to a voltage of 4.4 V at 0.1 C (with a theoretical gram capacity of 400 mAh/g), and then constant-voltage charged to a current of 0.025 C. A charge capacity was recorded.

Specific charge capacity of button battery containing positive electrode lithium supplementation material=Charge capacity/Mass of positive electrode lithium supplementation material.

"Specific Discharge Capacity Test"

The LANHE CT2001A system was used to perform the specific discharge capacity test in this application. The to-be-tested button battery containing the positive electrode lithium supplementation material was stood for 30 minutes in a 25±3° C. environment, constant-current charged to a voltage of 4.4 V at 0.1 C (with a theoretical gram capacity of 400 mAh/g), constant-voltage charged to a current of 0.025 C, and stood for 5 minutes. The button battery was constant-current discharged to a cut-off voltage of 2.5 V at 0.1 C, and an initial discharge capacity was recorded. Specific discharge capacity of button battery containing positive electrode lithium supplementation material=Discharge capacity/Mass of positive electrode lithium supplementation material.

Example 1

"Preparation of a Positive Electrode Plate"

The first positive electrode active material $Li_{0.998}Na_{0.002}Co_{0.976}Al_{0.021}Mg_{0.003}Ti_{0.001}Y_{0.001}O_2$, the second positive electrode active material $Li_{0.995}Na_{0.005}NiO_2$, a binder PVDF, and a conductive agent conductive carbon black were mixed at a mass ratio of 92.6:5.0:1.3:1.1, with a solvent NMP added. The resulting mixture was stirred into a uniform transparent system under vacuum to obtain a positive electrode slurry with a solid content of 75%. The positive electrode slurry was uniformly applied on an aluminum foil positive electrode current collector with a thickness of 10 μm and dried at 120° C. to obtain the positive electrode plate with a coating layer thickness of 110 μm. After the foregoing steps were completed, single surface coating of the positive electrode plate was completed. Then, the foregoing steps were repeated on the other surface of the positive electrode plate to obtain the positive electrode plate coated with positive electrode active materials on both surfaces. After coating was completed, cold pressing was performed, and the positive electrode plate was cut into a size of 74 mm×867 mm and then welded with tabs for later use.

"Preparation of a Negative Electrode Plate"

A negative electrode active material: a mixture of graphite and SiO (with a mass ratio of the graphite to SiO being 4:1), a binder polyacrylic acid (PAA), and conductive carbon black were mixed at a mass ratio of 95.7:3.2:1.1, with deionized water added as a solvent, to prepare an evenly-stirred slurry with a solid content of 70%. The slurry was uniformly applied on a copper foil current collector, dried at 120° C., and cold pressed to obtain the negative electrode plate with a single surface coated with an active material layer, where the negative electrode active material layer was 150 μm in thickness. After the foregoing steps were completed, the same method was used to complete these steps on the back of the negative electrode plate to obtain the negative electrode plate with both surfaces coated. After coating was completed, the negative electrode plate was cut into a size of 76 mm×851 mm and then welded with tabs for later use.

"Preparation of a Liquid Electrolyte"

In a dry argon atmosphere, organic solvents ethylene carbonate (EC), ethyl methyl carbonate (EMC), and diethyl carbonate (DEC) were mixed at a mass ratio of EC:EMC:DEC=1:1:1 to obtain an organic solution, and then a lithium salt lithium hexafluorophosphate ($LiPF_6$) was added to the organic solvents for dissolving and uniform mixing, to obtain the liquid electrolyte with a lithium salt concentration of 1 mol/L.

"Preparation of a Separator"

A polypropylene (PP) film (provided by Celgard) with a thickness of 14 μm was used.

"Preparation of a Lithium-Ion Battery"

The positive electrode, the separator, and the negative electrode prepared above were stacked in order, so that the separator was sandwiched between the positive and negative electrodes for separation, and was wound to obtain an electrode assembly. The electrode assembly was put into an aluminum-plastic film packaging bag, and was dehydrated at 80° C., and the prepared liquid electrolyte was injected. The lithium-ion battery was obtained after processes such as vacuum packaging, standing, formation, and shaping.

In Example 2, Example 3, Example 4, Example 5, Example 6, Example 7, Example 8, Example 9, Example 10, Example 11, Example 12, and Example 13, the preparation steps in "Preparation of a positive electrode plate", "Preparation of a negative electrode plate", "Preparation of a liquid electrolyte", "Preparation of a separator", and "Preparation of a lithium-ion battery" are the same as those in Example 1. Table 1 shows changes in related preparation parameters.

TABLE 1

| | First positive electrode active material | Second positive electrode active material | Mass ratio of first positive electrode active material, second positive electrode active material, binder, and conductive agent | Compacted density of positive electrode plate ($g/cm^3$) |
|---|---|---|---|---|
| Example 1 | $Li_{0.998}Na_{0.002}Co_{0.976}Al_{0.021}Mg_{0.003}Ti_{0.001}Y_{0.001}O_2$ | $Li_{1.995}Na_{0.005}NiO_2$ | 92.6:5.0:1.3:1.1 | 4.15 |
| Example 2 | $Li_{0.998}Na_{0.002}Co_{0.976}Al_{0.021}Mg_{0.003}Ti_{0.001}Y_{0.001}O_2$ | $Li_{1.995}Na_{0.005}NiO_2$ | 95.6:2.0:1.3:1.1 | 4.15 |
| Example 3 | $Li_{0.998}Na_{0.002}Co_{0.976}Al_{0.021}Mg_{0.003}Ti_{0.001}Y_{0.001}O_2$ | $Li_{1.995}Na_{0.005}NiO_2$ | 87.6:10:1.3:1.1 | 4.15 |
| Example 4 | $Li_{0.998}Na_{0.002}Co_{0.976}Al_{0.021}Mg_{0.003}Ti_{0.001}Y_{0.001}O_2$ | $Li_{1.995}Na_{0.005}NiO_2$ | 92.6:5.0:1.3:1.1 | 4.05 |
| Example 5 | $Li_{0.998}Na_{0.002}Co_{0.976}Al_{0.021}Mg_{0.003}Ti_{0.001}Y_{0.001}O_2$ | $Li_{1.995}Na_{0.005}NiO_2$ | 92.6:5.0:1.3:1.1 | 4.28 |
| Example 6 | $Li_{0.999}Na_{0.001}Co_{0.966}Al_{0.03}Mg_{0.005}Ti_{0.001}Y_{0.001}Zr_{0.001}O_2$ | $Li_{1.995}Na_{0.005}NiO_2$ | 92.6:5.0:1.3:1.1 | 4.15 |
| Example 7 | $Li_{1.02}Na_{0.003}Co_{0.959}Al_{0.025}Mg_{0.004}Ti_{0.001}La_{0.001}O_{1.99}$ | $Li_{1.995}Na_{0.005}NiO_2$ | 92.6:5.0:1.3:1.1 | 4.15 |
| Example 8 | $Li_{0.998}Na_{0.002}Co_{0.976}Al_{0.021}Mg_{0.003}Ti_{0.001}Y_{0.001}O_2$ | $Li_{2.159}Na_{0.001}Ni_{0.46}Cu_{0.46}O_2$ | 92.6:5.0:1.3:1.1 | 4.15 |
| Example 9 | $Li_{0.998}Na_{0.002}Co_{0.976}Al_{0.021}Mg_{0.003}Ti_{0.001}Y_{0.001}O_2$ | $Li_{1.839}Na_{0.001}Mn_{1.08}O_2$ | 92.6:5.0:1.3:1.1 | 4.15 |
| Example 10 | $Li_{0.998}Na_{0.002}Co_{0.976}Al_{0.021}Mg_{0.003}Ti_{0.001}Y_{0.001}O_2$ | $Li_{2.14}Na_{0.04}Fe_{0.95}O_{2.04}$ | 92.6:5.0:1.3:1.1 | 4.15 |
| Example 11 | $Li_{0.998}Na_{0.002}Co_{0.976}Al_{0.021}Mg_{0.003}Ti_{0.001}Y_{0.001}O_2$ | $Li_{1.91}Na_{0.03}Co_{1.05}O_{2.02}$ | 92.6:5.0:1.3:1.1 | 4.15 |
| Example 12 | $Li_{0.998}Na_{0.002}Co_{0.976}Al_{0.021}Mg_{0.003}Ti_{0.001}Y_{0.001}O_2$ | $Li_{2.09}Na_{0.01}Fe_{0.91}O_{1.96}$ | 92.6:5.0:1.3:1.1 | 4.15 |
| Example 13 | $Li_{0.998}Na_{0.002}Co_{0.976}Al_{0.021}Mg_{0.003}Ti_{0.001}Y_{0.001}O_2$ | $Li_{2.1}Na_{0.04}Fe_{0.91}O_{1.98}$ | 92.6:5.0:1.3:1.1 | 4.15 |

In Comparative Example 1, Comparative Example 2, Comparative Example 3, Comparative Example 4, and Comparative Example 5, preparation steps in "Preparation of a positive electrode plate", "Preparation of a negative electrode plate", "Preparation of a liquid electrolyte", "Preparation of a separator", and "Preparation of a lithium-ion battery" are the same as those in Example 1. Table 2 shows changes in the related preparation parameters.

TABLE 2

| | First positive electrode active material | Second positive electrode active material | Mass ratio of first positive electrode active material, second positive electrode active material, binder, and conductive agent | Compacted density of positive electrode plate ($g/cm^3$) |
|---|---|---|---|---|
| Comparative Example 1 | $LiCoO_2$ | / | 97.6:0:1.3:1.1 | 4.15 |
| Comparative Example 2 | / | $Li_2NiO_2$ | 0:97.6:1.3:1.1 | 3.72 |
| Comparative Example 3 | $LiCoO_2$ | $Li_2NiO_2$ | 92.6:5.0:1.3:1.1 | 4.15 |
| Comparative Example 4 | $LiCoO_2$ | $Li_2CuO_2$ | 92.6:5.0:1.3:1.1 | 4.15 |
| Comparative Example 5 | $LiCoO_2$ | $Li_2Ni_{0.5}Cu_{0.5}O_2$ | 92.6:5.0:1.3:1.1 | 4.15 |

Note:
"/" in Table 2 means no corresponding preparation parameters.

TABLE 3

| | First positive electrode active material | Mass percentage of first positive electrode active material (%) | Second positive electrode active material | Mass percentage of second positive electrode active material (%) | Compacted density of positive electrode plate ($g/cm^3$) | Number of cycles at high temperature | Energy density (Wh/L) |
|---|---|---|---|---|---|---|---|
| Example 1 | $Li_{0.998}Na_{0.002}Co_{0.976}Al_{0.021}Mg_{0.003}Ti_{0.001}Y_{0.001}O_2$ | 92.6 | $Li_{1.995}Na_{0.005}NiO_2$ | 5.0 | 4.15 | 729 | 778 |
| Example 2 | $Li_{0.998}Na_{0.002}Co_{0.976}Al_{0.021}Mg_{0.003}Ti_{0.001}Y_{0.001}O_2$ | 95.6 | $Li_{1.995}Na_{0.005}NiO_2$ | 2.0 | 4.15 | 696 | 762 |
| Example 3 | $Li_{0.998}Na_{0.002}Co_{0.976}Al_{0.021}Mg_{0.003}Ti_{0.001}Y_{0.001}O_2$ | 87.6 | $Li_{1.995}Na_{0.005}NiO_2$ | 10.0 | 4.15 | 675 | 741 |
| Example 4 | $Li_{0.998}Na_{0.002}Co_{0.976}Al_{0.021}Mg_{0.003}Ti_{0.001}Y_{0.001}O_2$ | 92.6 | $Li_{1.995}Na_{0.005}NiO_2$ | 5.0 | 4.05 | 701 | 761 |
| Example 5 | $Li_{0.998}Na_{0.002}Co_{0.976}Al_{0.021}Mg_{0.003}Ti_{0.001}Y_{0.001}O_2$ | 92.6 | $Li_{1.995}Na_{0.005}NiO_2$ | 5.0 | 4.28 | 712 | 801 |
| Example 6 | $Li_{0.999}Na_{0.001}Co_{0.966}Al_{0.03}Mg_{0.005}Ti_{0.001}Y_{0.001}Zr_{0.001}O_2$ | 92.6 | $Li_{1.995}Na_{0.005}NiO_2$ | 5.0 | 4.15 | 718 | 777 |
| Example 7 | $Li_{1.02}Na_{0.003}Co_{0.959}Al_{0.025}Mg_{0.004}Ti_{0.001}La_{0.001}O_{1.99}$ | 92.6 | $Li_{1.995}Na_{0.005}NiO_2$ | 5.0 | 4.15 | 731 | 779 |
| Example 8 | $Li_{0.998}Na_{0.002}Co_{0.976}Al_{0.021}Mg_{0.003}Ti_{0.001}Y_{0.001}O_2$ | 92.6 | $Li_{2.159}Na_{0.001}Ni_{0.46}Cu_{0.46}O_2$ | 5.0 | 4.15 | 719 | 778 |

TABLE 3-continued

| | First positive electrode active material | Mass percentage of first positive electrode active material (%) | Second positive electrode active material | Mass percentage of second positive electrode active material (%) | Compacted density of positive electrode plate (g/cm$^3$) | Number of cycles at high temperature | Energy density (Wh/L) |
|---|---|---|---|---|---|---|---|
| Example 9 | $Li_{0.998}Na_{0.002}Co_{0.976}Al_{0.021}Mg_{0.003}Ti_{0.001}Y_{0.001}O_2$ | 92.6 | $Li_{1.839}Na_{0.001}Mn_{1.08}O_2$ | 5.0 | 4.15 | 692 | 776 |
| Example 10 | $Li_{0.998}Na_{0.002}Co_{0.976}Al_{0.021}Mg_{0.003}Ti_{0.001}Y_{0.001}O_2$ | 92.6 | $Li_{2.14}Na_{0.04}Fe_{0.95}O_{2.04}$ | 5.0 | 4.15 | 707 | 775 |
| Example 11 | $Li_{0.998}Na_{0.002}Co_{0.976}Al_{0.021}Mg_{0.003}Ti_{0.001}Y_{0.001}O_2$ | 92.6 | $Li_{1.91}Na_{0.03}Co_{1.05}O_{2.02}$ | 5.0 | 4.15 | 727 | 779 |
| Example 12 | $Li_{0.998}Na_{0.002}Co_{0.976}Al_{0.021}Mg_{0.003}Ti_{0.001}Y_{0.001}O_2$ | 92.6 | $Li_{2.09}Na_{0.01}Fe_{0.91}O_{1.96}$ | 5.0 | 4.15 | 705 | 771 |
| Example 13 | $Li_{0.998}Na_{0.002}Co_{0.976}Al_{0.021}Mg_{0.003}Ti_{0.001}Y_{0.001}O_2$ | 92.6 | $Li_{2.1}Na_{0.04}Fe_{0.91}O_{1.98}$ | 5.0 | 4.15 | 711 | 772 |
| Comparative Example 1 | $LiCoO_2$ | 97.6 | / | / | 4.15 | 405 | 740 |
| Comparative Example 2 | / | 0 | $Li_2NiO_2$ | 97.6 | 3.72 | 0 | 368 |
| Comparative Example 3 | $LiCoO_2$ | 92.6 | $Li_2NiO_2$ | 5.0 | 4.15 | 416 | 767 |
| Comparative Example 4 | $LiCoO_2$ | 92.6 | $Li_2CuO_2$ | 5.0 | 4.15 | 431 | 765 |
| Comparative Example 5 | $LiCoO_2$ | 92.6 | $Li_2Ni_{0.5}Cu_{0.5}O_2$ | 5.0 | 4.15 | 425 | 767 |

Note:
"/" in Table 3 means no corresponding preparation parameters.

It can be learned from Example 1, Example 2, Example 3, Example 4, Example 5, Example 6, Example 7, Example 8, Example 9, Example 10, Example 11, Example 12, Example 13, Comparative Example 1, Comparative Example 2, Comparative Example 3, Comparative Example 4, and Comparative Example 5 that the lithium-ion battery having the first positive electrode active material and the second positive electrode active material in this application had significantly increased number of high-temperature cycles and excellent cycling performance. The reason might be as follows: the synergistic effect between the first positive electrode active material and the second positive electrode active material in this application could expand a lithium ion migration channel, thereby improving high-temperature cycling performance and volumetric energy density of the lithium-ion secondary battery. However, the positive electrode plate in Comparative Example 1 had only the first positive electrode active material LiCoO$_2$ of a layered structure. Crystal lattice of the first positive electrode active material had high true density, and the positive electrode plate made of the first positive electrode active material had high compacted density. However, low initial coulombic efficiency of the graphite/SiO negative electrode resulted in low energy density of the lithium-ion secondary battery. The positive electrode plate in Comparative Example 2 had only the second positive electrode active material Li$_2$NiO$_2$ that had a high initial specific charge capacity, but a low specific discharge capacity and poor cycling stability. Therefore, energy density of the lithium-ion secondary battery assembled by using the positive electrode plate was quite low.

The percentage of the first positive electrode material also usually affected the performance of the lithium-ion secondary battery. It can be learned from Example 1, Example 2, and Example 3 that a lithium-ion secondary battery with high-temperature cycling performance could be obtained provided that a percentage of the first positive electrode active material was kept within the range of this application.

The compacted density of the first positive electrode active material also usually affected the performance of the lithium-ion secondary battery. It can be learned from Example 1, Example 4, and Example 5 that under the condition that the same first positive electrode active material and the same second positive electrode active material were used, the lithium-ion secondary battery prepared by using the positive electrode plate having compacted density within the range of this application had significantly increased number of high-temperature cycles and excellent cycling performance.

The foregoing descriptions are merely preferred embodiments of this application, but are not intended to limit this application. Any modification, equivalent replacement, or improvement made without departing from the spirit and principle of this application shall fall within the protection scope of this application.

What is claimed is:
1. A positive electrode plate, comprising:
a positive electrode current collector and a positive electrode active material layer disposed on at least one surface of the positive electrode current collector; wherein,
the positive electrode active material layer comprises a first positive electrode active material and a second positive electrode active material;
the first positive electrode active material is represented by chemical formula (1) and the second positive electrode active material is represented by chemical formula (2):

wherein in chemical formula (1), M comprises at least one of Zr, La, or Y, −0.1<x<0.1, 0<a<0.005, −0.05<y<0.05, 0.01<z<0.05, 0.001<p<0.01, 0<u<0.005, 0<v<0.005, and −0.05<w<0.05; and wherein in chemical formula (2), $-0.2<r<0.2$, $0<s\leq0.05$, $-0.1<q<0.1$, $-0.05<t<0.05$, and N comprises at least one of Ni, Cu, Mn, Fe, or Co; and wherein based on a total mass of the positive electrode active material layer, a mass ratio of the first positive electrode active material to the second positive electrode active material ranges from 4:1 to 200:1.

2. The positive electrode plate according to claim 1, wherein 3.85 g/cm$^3$<P<4.35 g/cm$^3$; P is a compacted density of the positive electrode plate.

3. The positive electrode plate according to claim 1, wherein based on a total mass of the positive electrode active material layer, a mass percentage of the first positive electrode active material ranges from 80% to 98.5%.

4. The positive electrode plate according to claim 1, wherein Dv50 of the first positive electrode active material ranges from 3 μm to 20 μm, and Dv90 of the first positive electrode active material ranges from 12 μm to 45 μm.

5. The positive electrode plate according to claim 1, wherein Dv50 of the second positive electrode active material ranges from 6 μm to 18 μm, and Dv90 of the second positive electrode active material ranges from 15 μm to 32 μm.

6. The positive electrode plate according to claim 1, wherein X≥300 mAh/g, and Y/X≤40%;

wherein X is an initial specific charge capacity of the second positive electrode active material, and Y is an initial specific discharge capacity of the second positive electrode active material.

7. The positive electrode plate according to claim 1, wherein 4.05 g/cm$^3$<P<4.30 g/cm$^3$; P is a compacted density of the positive electrode plate.

8. The positive electrode plate according to claim 1, wherein a mass ratio of the first positive electrode active material to the second positive electrode active material ranges from 9:1 to 100:1.

9. The positive electrode plate according to claim 1, wherein based on a total mass of the positive electrode active material layer, a mass percentage of the first positive electrode active material ranges from 85% to 98.5%.

10. The positive electrode plate according to claim 1, wherein Dv50 of the first positive electrode active material ranges from 5 μm to 16 μm, and Dv90 of the first positive electrode active material ranges from 18 μm to 40 μm.

11. The positive electrode plate according to claim 1, wherein Dv50 of the second positive electrode active material ranges from 10 μm to 16 μm, and Dv90 of the second positive electrode active material ranges from 18 μm to 30 μm.

12. The positive electrode plate according to claim 1, wherein the positive electrode active material layer comprises a first positive electrode active material layer and a second positive electrode active material layer, the first positive electrode active material layer comprises the first positive electrode active material, and the second positive electrode active material layer comprises the second positive electrode active material.

13. An electrochemical apparatus, comprising a positive electrode plate, wherein the positive electrode plate comprises a positive electrode current collector and a positive electrode active material layer disposed on at least one surface of the positive electrode current collector; wherein, the positive electrode active material layer comprises a first positive electrode active material and a second positive electrode active material;

the first positive electrode active material is represented by chemical formula (1) and the second positive electrode active material is represented by chemical formula (2):

$$Li_{1+x}Na_aCo_{1+y}Al_zMg_pTi_uM_vO_{2+w} \quad (1),$$

wherein in chemical formula (1), M comprises at least one of Zr, La, or Y, $-0.1<x<0.1$, $0<a<0.005$, $-0.05$ y<0.05, $0.01<z<0.05$, $0.001<p<0.01$, $0<u<0.005$, $0<v<0.005$, and $-0.05<w<0.05$; and $$Li_{2+r}Na_sN_{1+q}O_{2+t} \quad (2),$$

wherein in chemical formula (2), $-0.2<r<0.2$, $0<s<0.05$, $-0.1<q<<0.1$, $-0.05<t<0.05$, and N comprises at least one of Ni, Cu, Mn, Fe, or Co; and wherein based on a total mass of the positive electrode active material layer, a mass ratio of the first positive electrode active material to the second positive electrode active material ranges from 4:1 to 200:1.

14. The electrochemical apparatus according to claim 13, wherein 3.85 g/cm$^3$<P<4.35 g/cm$^3$; P is a compacted density of the positive electrode plate.

15. The electrochemical apparatus according to claim 13, wherein based on a total mass of the positive electrode active material layer, a mass percentage of the first positive electrode active material ranges from 80% to 98.5%.

16. The electrochemical apparatus according to claim 13, wherein the positive electrode active material layer comprises a first positive electrode active material layer and a second positive electrode active material layer, the first positive electrode active material layer comprises the first positive electrode active material, and the second positive electrode active material layer comprises the second positive electrode active material.

17. An electronic apparatus, comprising the electrochemical apparatus according to claim 13.

* * * * *